United States Patent [19]

Sheridan et al.

[11] 4,323,744
[45] Apr. 6, 1982

[54] SWITCH FOR CONTROLLING A PLURALITY OF LIGHTING CIRCUITS

[75] Inventors: John J. Sheridan, Middletown; Allen K. Schwartz, Alexandria; Willis H. Anderson, Anderson, all of Ind.

[73] Assignee: General Motors Corporation, Detroit, Mich.

[21] Appl. No.: 195,185

[22] Filed: Oct. 8, 1980

[51] Int. Cl.³ .......................................... H01H 21/80
[52] U.S. Cl. ........................ 200/153 LB; 200/6 BB; 200/153 L; 200/339
[58] Field of Search ........ 200/153 H, 153 L, 153 LA, 200/153 LB, 6 B, 6 BB, 339

[56] References Cited

U.S. PATENT DOCUMENTS

| | | | |
|---|---|---|---|
| 2,809,260 | 10/1957 | Beckett | 200/153 |
| 2,879,345 | 3/1959 | Mossman | 200/153 L |
| 2,953,656 | 9/1960 | Bates | 200/67 |
| 2,966,559 | 12/1960 | Meyer | 200/6 BB |
| 3,225,156 | 12/1965 | Sahrbacker | 200/339 |
| 3,878,344 | 4/1975 | Lockard | 200/6 B |
| 3,883,705 | 5/1975 | Sebastian et al. | 200/153 LB |
| 4,024,362 | 5/1977 | Morgan et al. | 200/1 TK |
| 4,081,632 | 3/1978 | Schäffeler | 200/153 LB |
| 4,148,002 | 4/1979 | Krasser | 200/67 C |

*Primary Examiner*—Willis Little
*Attorney, Agent, or Firm*—Edward J. Biskup

[57] ABSTRACT

A switch having a pair of operating levers located within a housing in side-by-side relationship and in which the pair of operating levers are supported for conjoint and independent movement about a common pivot axis for selectively opening and closing contact members which establish a plurality of lighting circuits.

3 Claims, 8 Drawing Figures

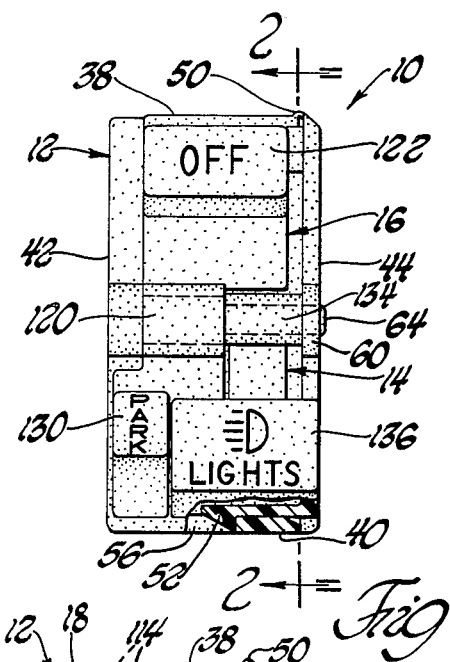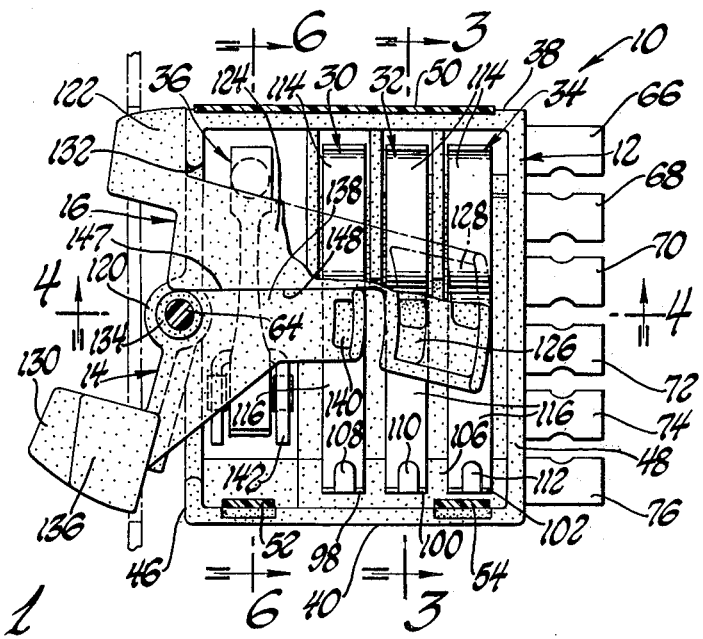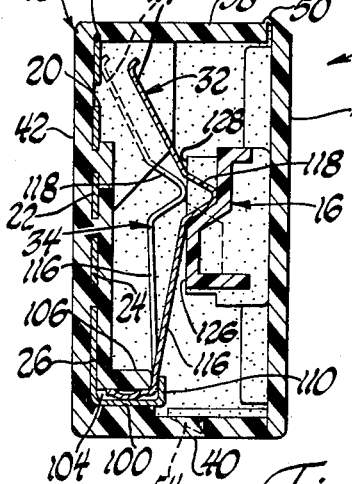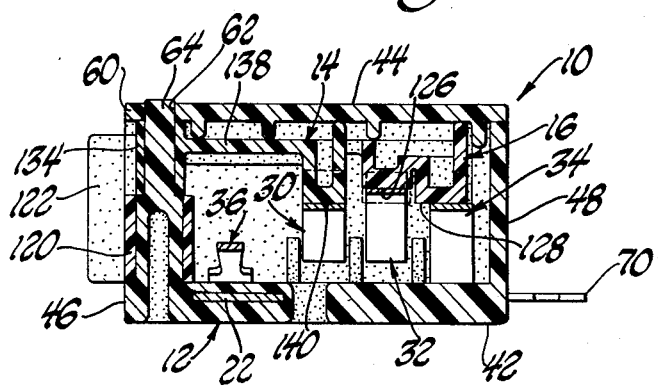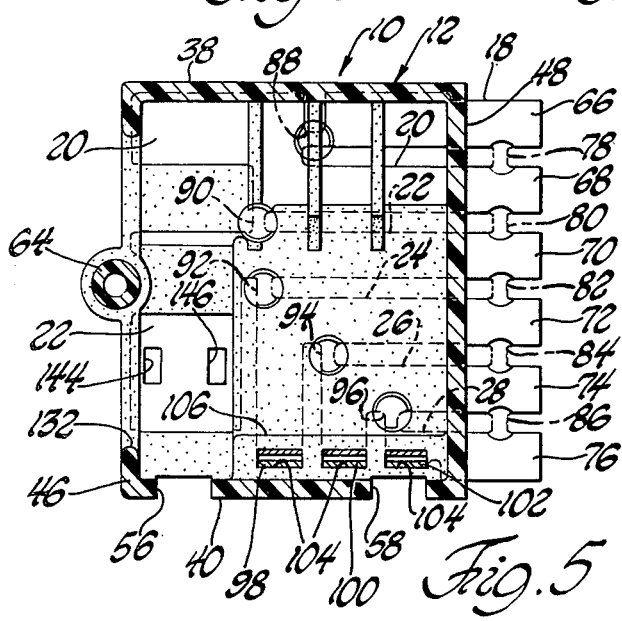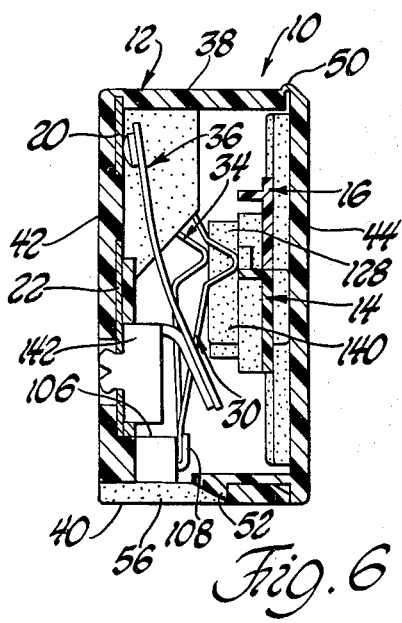

SWITCH FOR CONTROLLING A PLURALITY OF LIGHTING CIRCUITS

This invention relates to switches and, more particularly, concerns a switch having a pair of operating levers capable of controlling a plurality of lighting circuits, such as the electric circuits for the head lights, tail lights and parking lights on a motor vehicle.

More specifically, the switch made in accordance with the present invention has a pair of operating levers supported in side-by-side relationship within a housing for pivotal movement about a common transverse axis. One of the operating levers is formed with a cam and is adapted to assume a first position wherein the cam closes a first pair of contacts to complete a first lighting circuit, and also is adapted to assume a second position wherein the first pair of contacts remain open. The other operating lever includes a cam and is adapted to also assume a first position wherein the cam associated therewith closes a second pair of contacts to complete a second lighting circuit, and is adapted to assume a second position wherein the second pair of contacts remain open. In addition, cooperating surfaces are formed on the pair of operating levers so as to permit one of the operating levers to independently close the first pair of contacts when moved from the second position to the first position, and allows the other operating lever to close the second pair of contacts and simultaneously shift the associated operating lever to the first position to close the first pair of contacts when both operating levers are in the second position and the other operating lever is moved from the second position to the first position.

The objects of the present invention are: to provide a new and improved switch having a pair of operating levers pivotally supported in a housing and having cooperating surfaces for providing selective independent and conjoint operation of the operating levers; to provide a new and improved switch that has a pair of operating levers positioned relative to each other so that when one of the operating levers is pivoted from a first position to a second position, the other operating lever is simultaneously pivoted to the second position and causes a pair of spaced contacts to be closed; to provide a new and improved switch having a pair of operating levers supported in a housing for pivotal movement between first and second positions, with each of the operating levers being provided with a cam for urging a movable contact member into engagement with a stationary contact member, and in which the movable contact member serves as a detent for maintaining the associated operating lever in the first and second positions; and to provide a new and improved switch having a pair of rocker-type operating levers located within a housing in side-by-side relationship, and in which the pair of operating levers are supported for conjoint and independent movement about a common joint axis for selectively opening and closing contact members which establish a plurality of lighting circuits.

Other objects and advantages of the present invention will be more apparent from the following detailed description when taken in conjunction with the accompanying drawings, in which:

FIG. 1 is a front elevational view of a switch made in accordance with the present invention;

FIG. 2 is a side view of the switch taken on line 2—2 of FIG. 1;

FIG. 3 is a sectional view of the switch taken on line 3—3 of FIG. 2, showing a cam formed with one of the switch operatin levers;

FIG. 4 is a sectional view of the switch taken on line 4—4 of FIG. 2, showing cams formed on both of the switch operating levers;

FIG. 5 is a view of the switch similar to that shown in FIG..2, but with the operating levers, circuit breaker, and movable contact members removed for clarity purposes;

FIG. 6 is another sectional view of the switch taken on line 6—6 of FIG. 2, showing the circuit breaker incorporated in the switch;

Figure 8:
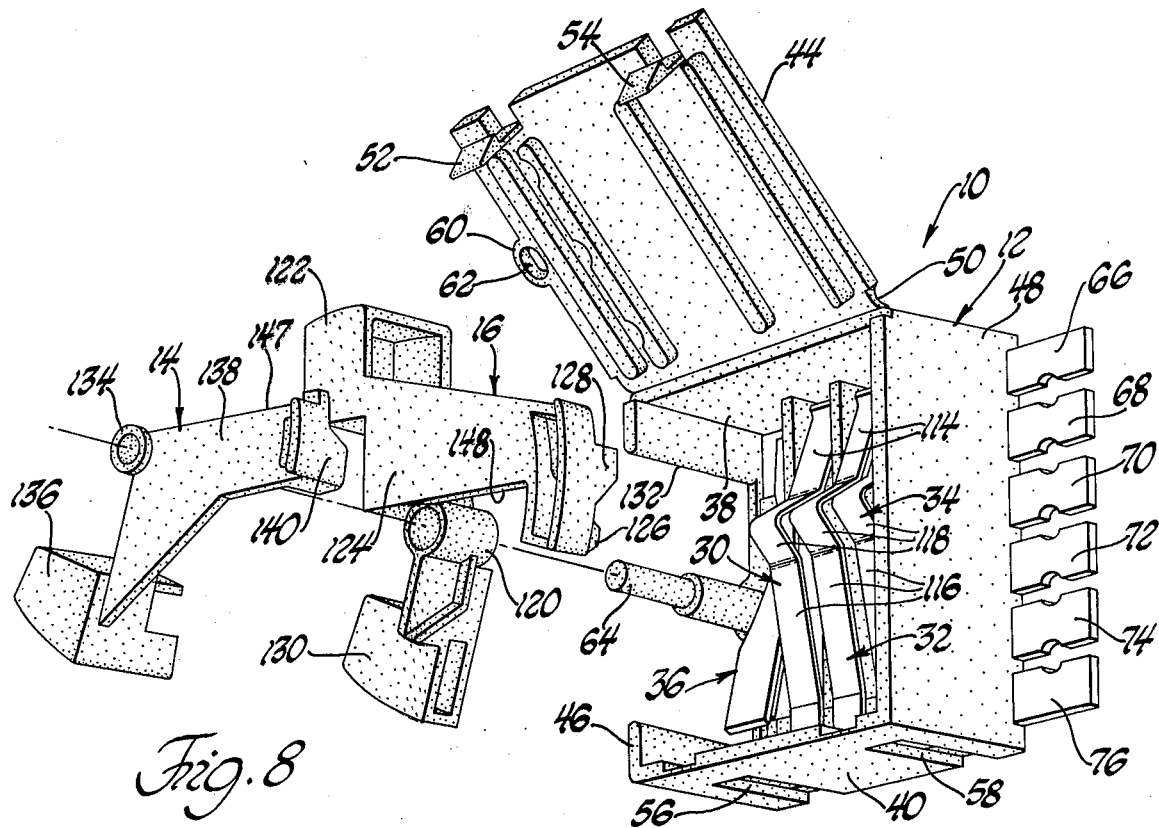
FIG. 8 is an exploded view of the switch showing the various parts thereof in perspective.

Referring to the drawings—and more particularly to FIGS. 1, 2, and 8 thereof, a switch 10 made in accordance with the present invention is shown. The switch 10 generally comprises a housing 12; a pair of operating levers 14 and 16; stationary contact members 18, 20, 22, 24, 26, and 28; movable contact members 30, 32, and 34; and a circuit breaker 36. Operating levers 14 and 16 are located side-by-side in the housing 12 and are supported for limited pivotal movement about a common transverse axis so that upon pivotal movement of one or the other or both of the operating levers 14 and 16, associated means (hereinafter described) serve to selectively move one or more of the movable contact members 30, 32, 34, into or out of engagement with two of the stationary contact members 18-28 and thereby establish one or more lighting circuits.

More specifically, the housing 12 is made of any suitable insulating material, such as plastic, and generally consists of a top wall 38, a bottom wall 40, a pair of side walls 42 and 44, and a pair of end walls 46 and 48. A resilient hinge 50 is integrally formed with the upper edge of the side wall 44 and the top wall 38. The hinge 50 allows the side wall 44 to swing to an open position so as to facilitate assembly of the switch 10. In this regard it will be noted that the side wall 44 has a pair of barb-type lock members 52 and 54 projecting outwardly therefrom which are normally located in rectangular openings 56 and 58, respectively, for locking the lower edge of the side wall 44 to the bottom wall 40—as shown in FIGS. 1 through 6, after assembly of the switch 10. The side wall 44 also includes an ear 60 having a circular opening 62 formed therein which serves to accommodate the free end of a stepped-diameter shaft 64 formed integrally with and extending laterally from the opposite side wall 42. The shaft 64 pivotally supports both operating levers 14 and 16 and defines the aforementioned transverse pivot axis about which the operating levers 14 and 16 rotate between "ON" and "OFF" positions. The side wall 42 also serves as a support for the stationary contact members 18–28 which are embedded in the inner surface of side wall 42 during the molding operation and are positioned so that terminal portions 66–76, integrally formed with the respective stationary contact members 18–28, extend through the end wall 48 for electrical connection with a wiring harness (not shown) which connects the switch 10 to the various lighting circuits on a motor vehicle.

The stationary contact members 18–28 can be stamped from a single sheet of copper into the configuration shown in FIG. 5. After the side wall 42 of housing 12 is molded about the stationary contact members 18–28, the interconnecting web sections 78–96, shown in phantom lines in FIG. 5, are removed with a gang-punch or other suitable tool. In addition, it will be noted that the stationary contact members 24, 26, and 28 are integrally formed with laterally extending connector portions 98, 100, 102, respectively, each of which is located within an aperture 104 formed in a ledge 106 integrally molded with the side wall 42 and bottom wall 40. The connector portions 98, 100, and 102 terminate with respective tabs 108, 110, and 112 which are adapted to be crimped into electrical engagement with the lower portions of movable contact members 30, 32, and 34, as seen in FIGS. 2 and 3. In this manner, each of the movable contact members 30, 32, and 34 is retained in a desired position within the housing 12.

Each of the movable contact members 30, 32, 34, is made from an electrically conductive material such as brass and, as seen in FIG. 3, comprises a contact section 114, a connector section 116, and an intermediate V-shaped detent section 118 which interconnects contact section 114 with connector section 116. Movable contact members 30 and 32 have their contact sections 114 normally spaced apart from the associated stationary contact members 18 and 20 when either or both of the operating levers 14 and/or 16 are in the "OFF" position. The movable contact member 34, however, has its contact section 114 in engagement with the stationary contact member 18 when the operating levers 14 and 16 are in the "OFF" position. It is only after movement of one or the other or both of the operating levers 14 and 16 to an "ON" position that one or the other or both of the movable contact members 30 and 32 move into engagement while the movable contact member 34 moves out of engagement with a stationary contact member. Thus, the movable contact members 30, 32, 34, function as spring members which are normally spaced from the stationary contact members 18 and 20 are movable into engagement with stationary contact members 18 and 20 through a biasing force produced by the operating levers 14 and 16, as will be more fully described hereinafter.

As seen in FIGS. 1, 2, and 8, the operating lever 16 comprises a hub portion 120 which is rotatably supported on the larger diameter portion of the shaft 64 and allows the operating lever 16 to pivot between an "OFF" position and an "ON" position. An upper button section 122 bearing the legend "OFF" is integrally formed with the hub portion 120 and includes a rearwardly projecting arm 124 formed with a pair of cams 126 and 128 which are vertically off-set from each other, as seen in FIGS. 2 and 3. Hub portion 120 is also integrally formed with a lower button section 130 bearing the legend "PARK", and the arrangement is such that when the operating lever 16 is mounted on the larger diameter portion of the shaft 64, the upper ("OFF") and lower ("PARK") button sections 122 and 130 are located outside of the housing 12 adjacent end wall 46, while the arm 124 projects through a rectangular opening 132 formed in end wall 46 into the interior of housing 12, as seen in FIGS. 1–4. In addition, cams 126 and 128 formed on arm 124 are positioned adjacent to movable contact members 32 and 34, respectively, and serve to move the movable contact members 32 and 34 into and out of engagement with stationary contact member 18, as will be explained.

The other operating lever 14 is also formed with a hub portion 134 which, in this case, is rotatably supported on the smaller diameter portion of shaft 64 and allows operating lever 14 to pivot between an "OFF" position and an "ON" position. Hub portion 134 is integrally formed with a button section 136 bearing the legend "LIGHTS", as seen in FIG. 1. In addition, hub portion 134 is integral with a rearwardly extending arm 138 which is formed with a cam 140 adapted to engage movable contact member 30 for moving movable contact member 30 into and out of engagement with stationary contact member 20.

At this point of the description, it will be noted that when the operating levers 14 and 16 are mounted on the shaft 64 in the operating positions shown in FIGS. 1–6, the arm 138 of operating lever 14 is located directly below and in the plane of arm 124 of operating lever 16. As a result, either conjoint or independent movement of operating levers 14 and 16 is possible. It will also be noted that the circuit breaker 36, made of a bimetal, serves as an overload protection for the switch 10 and—as seen in FIGS. 2 and 6, is mounted on a U-shaped metal support member 142 which extends through and is held within a pair of rectangular apertures 144 and 146 formed in the stationary contact member 22, as seen in FIG. 7.

As seen in FIGS. 1 through 6, the switch 10 made in accordance with the invention is in the "OFF" position—with the operating levers 14 and 16 assuming the full-line "OFF" positions shown in FIG. 2. In the "OFF" positions of operating levers 14 and 16, the upper (or "OFF") button section 122 formed with operating lever 16, engages the outer surface of end wall 46 of housing 12. At the same time, the cam 128 of arm 124 integrally formed with the operating lever 16 engages the V-shaped detent section 118 of movable contact member 34 and causes the contact section 114 thereof to be in engagement with the stationary contact member 18. In addition—and as best seen in FIG. 3, the detent section 118 formed with movable contact member 32 is located in the space above cam 126 of arm 124. As a result, the outward biasing force of movable contact members 32 and 34, acting against the respective cams 126 and 128, tends to maintain the operating lever 16 in a firm and fixed "OFF" position. Also, arm 124 of operating lever 16 engages arm 138 of operating lever 14 and, as a consequence, serves to position operating lever 14 so that the cam 140 of arm 138 is located below the detent section 118 of movable contact member 30 with the result that the contact section 114 of movable contact member 30 is spaced apart from the stationary contact member 20. In this "OFF" position of operating levers 14 and 16, there is no energization of the lighting circuits and therefore neither the headlights nor the parking lights of the motor vehicle are illuminated. Now, by manually pressing the lower (or "PARK") button section 130 inwardly towards end wall 46 of housing 12, operating lever 16 will rotate in a counter-clockwise direction (as seen in FIG. 2) so that both cams 126 and 128 of arm 124 move upwardly, with the detent section 118 of movable contact member 34 moving into a position below the cam 128, while the detent section 118 formed with movable contact member 32 is located in horizontal alignment with the cam 126. In this position of operating lever 16, the movable contact member 34 will be spaced apart from and have its contact section 114 out of engagement with the stationary contact member 18, while the contact section 114 of movable contact member 32 is now moved into engagement with the stationary contact member 18. Thus, the operating lever 16 assumes the "PARK" or "ON" position at which time the parking lights circuit and tail lights circuit of the motor will be energized. During this time the operating lever 14 remains in the full-line "OFF" position shown in FIG. 2, with cam 140 of arm 138 located below the detent section 118 of movable contact member 30 so that the contact section 114 thereof is spaced apart from the stationary contact member 20. However, if it should be desired, the button section 136 bearing the legend "LIGHTS" can be pressed into engagement with end wall 46 of housing 12, causing operating lever 14 to rotate in a counterclockwise direction and move cam 140 of arm 138 associated therewith upwardly into horizontal alignment with the detect section 118 of movable contact member 30. Such movement, of course, causes the contact section 114 of movable contact member 30 to engage the stationary contact member 20. This is the "HEADLIGHT" or "ON" position for operating lever 14 at which time the headlights of the motor vehicle are illuminated.

It should be understood that when the operating levers 14 and 16 are in the full-line "OFF" positions shown in FIG. 2, and if the button section 136 of operating lever 14 is moved to the "HEADLIGHT" or "ON" position, the upper edge 147 of arm 138 of operating lever 14 will engage the lower edge 148 of arm 124 of operating lever 16 and move the operating lever 16 in a counterclockwise direction to the "ON" position so that the circuitry for both the headlights and parking lights as well as the tail lights is energized by simply pressing a single button.

Figure 7:
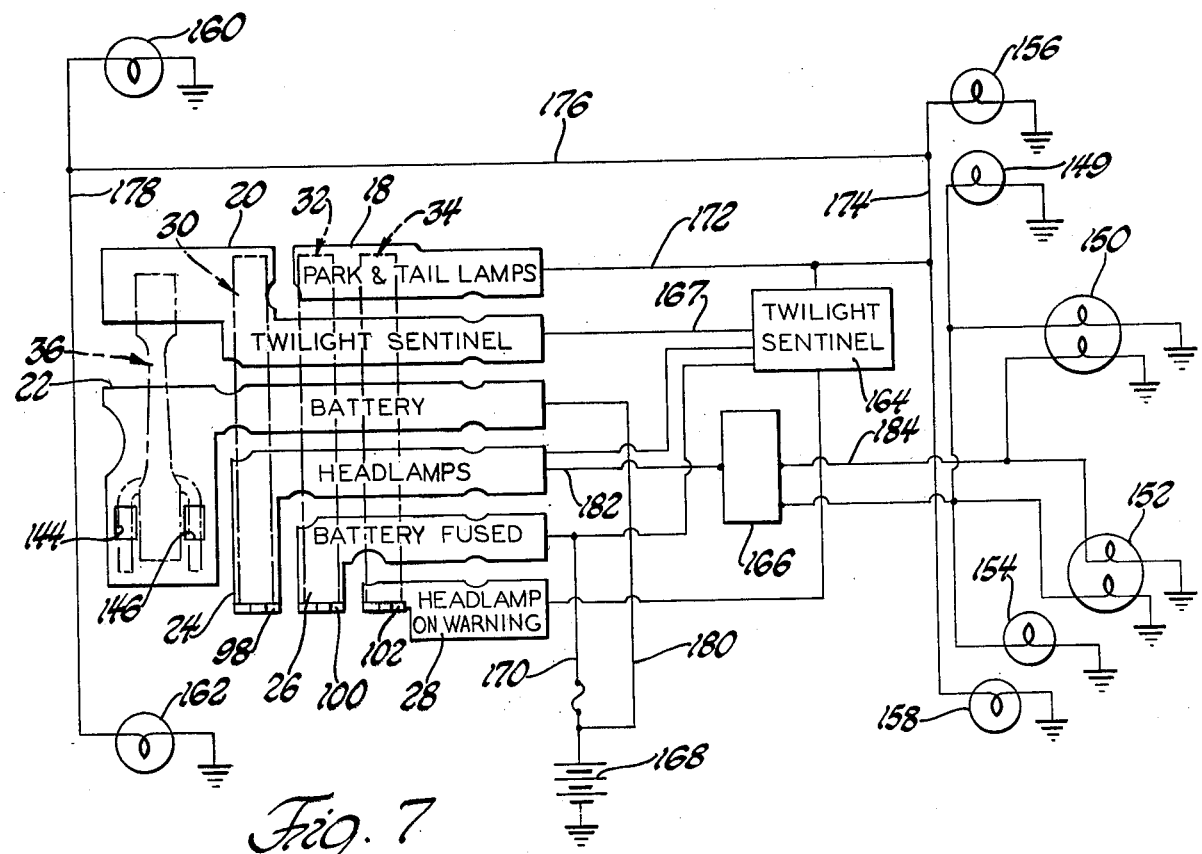
FIG. 7 is a schematic diagram of the several lighting circuits of a motor vehicle controlled by the switch made in accordance with this invention.

Referring now to FIG. 7, a schematic circuit diagram is shown incorporating the movable and stationary contact members of the switch 10 of the present invention electrically connected to various elements of the motor vehicle lighting system. It will be noted that the parts shown in FIG. 7 which correspond to parts described above are identified by the same reference numerals.

The headlights are identified by the same reference numerals.

The headlights of the motor vehicle are designated by the reference numerals 149, 150, 152, and 154; the parking lights are designated 156 and 158; the tail lights are designated 160 and 162; and reference numeral 164 identifies a "twilight sentinel". Also, it will be noted that the dimmer switch is designated by reference numeral 166.

In the "OFF" position of operating levers 14 and 16 of switch 10, the cam 128 associated with arm 124 of operating lever 16 causes the movable contact member 34, as seen in phantom lines in FIG. 7, to electrically connect the stationary contact member 28 (identified as "HEADLAMP-ON WARNING") with the stationary contact member 18 ) identified as "PARK & TAIL LAMPS"). At the same time, the stationary contact member 22 (identified as "BATTERY") is connected through the circuit breaker 36, and the stationary contact member 20 (identified as "TWILIGHT SENTINEL"), to the twilight sentinel 164 via conductor 167.

When the lower ("PARK") button section 130 is manually pressed towards end wall 46 of housing 12 to the "ON" position, movable contact member 34, as seen in phantom lines in FIG. 7, is disconnected from the stationary contact member 18 (identified as "PARK & TAIL LAMPS") while, at the same time, movable contact member 32 electrically connects stationary contact member 26 (identified as "BATTERY FUSED") with stationary contact member 18 (identified as "PARK & TAIL LAMPS"), resulting in energization of the parking lights 156 and 158 and tail lights 160 and 162. This circuit is established from the battery 168, via conductor 170, stationary contact member 26, movable contact member 32, stationary contact member 18, and conductors 172, 174, 176, and 178.

When it is desired to energize the low-beam filaments of the headlights 150 and 152, the ("LIGHTS") button section 136 of operating lever 14 is manually pressed towards end wall 46 of housing 12 to the "ON" position so as to cause the movable contact member 30 to electrically interconnect stationary contact member 24 (identified as "HEADLAMPS") with stationary contact member 20 (identified as "TWILIGHT SENTINEL"). During this time both the parking lights 156 and 158 and tail lights 160 and 162 are maintained in electrical contact with the battery 168 through the movable contact member 32, and the low-beam filaments of headlights 150 and 152 are connected with the battery 158 through the conductor 180, stationary contact member, circuit breaker 36, stationary contact member 20, movable contact member 30, stationary contact member 24, conductor 182, dimmer switch 166, and conductor 184. Afterwards, if it is desired to deenergize the low-beam filaments of headlights 150 and 152, parking lights 156 and 158, and tail lights 160 and 162, the upper ("OFF") button section 122 of operating lever 16 is manually pressed towards end wall 46 of housing 12 to the "OFF" position, causing operating lever 14 to pivot in a clockwise direction about the shaft 64 into the full-line position shown in FIG. 2, at which time cam 128 on arm 124 again causes the movable contact member 34 to provide an electrical connection between stationary contact member 28 (identified as "HEADLAMP-ON WARNING") and the stationary contact member 18 (identified as "PARK & TAIL LAMPS"). At the same time, cam 126 on arm 124 assumes the position shown in FIG. 3 resulting in the connector section 114 of the movable contact member 32 moving out of engagement with the stationary contact member 18 (identified as "PARK & TAIL LAMPS"). As previously mentioned, the arms 124 and 138 of respective operating levers 16 and 14 are vertically aligned and have cooperating surfaces so that when operating lever 16 rotates in a clockwise direction into the "OFF" position, operating lever 14 is also rotated in a clockwise direction into the full-line position shown in FIG. 2. Such movement causes cam 140 of arm 138 associated with operating lever 14 to move off of the detent section 118 of movable contact member 30 so that the contact section 114 thereof moves laterally outwardly out of engagement with stationary contact member 20 (identified as "TWILIGHT SENTINEL").

Finally, it will be noted that when the operating levers 14 and 16 of the switch 10 are in the "OFF" position shown in FIG. 2, if the ("LIGHTS") button section 136 of operating lever 14 is manually pressed into engagement with end wall 46 of housing 12, both operating levers 14 and 16 are rotated through the cooperating respective edges 148 and 147 of vertically aligned arms 124 and 128 in a counterclockwise direction and into the "ON" positions described hereinbefore.

Various changes and modifications can be made in this construction without departing from the spirit of the invention. Such changes and modifications are contemplated by the inventors, and they do not wish to be limited, except by the scope of the appended claims.

The embodiments of the invention in which an exclusive property or privilege is claimed are defined as follows:

1. A switch for controlling a plurality of lighting circuits on a motor vehicle, comprising a housing; a first operating lever and a second operating lever supported in side-by-side relationship by said housing for pivotal movement about a common transverse axis; a first cam formed on said first operating lever; a first pair of contacts carried by said housing for controlling a first lighting circuit; a second cam formed on said second operating lever; a second pair of contacts carried by said housing for controlling a second lighting circuit, said first operating lever having a first position wherein said first cam closes said first pair of contacts to complete said first lighting circuit, and a second position wherein said first pair of contacts remain open, said second operating lever having a first position wherein said second cam closes said second pair of contacts to complete said second lighting circuit and a second position wherein said second pair of contacts remain open; and cooperating means formed on said first operating lever and said second operating lever permitting said first operating lever to independently close said first pair of contacts when moved from said second position to said first position and allowing said second operating lever to close said second pair of contacts and simultaneously shift said first operating lever to said first position to close said first pair of contacts when said first operating lever and said second operating lever are in said second position and said second operating lever is moved from said second position to said first position.

2. A switch for controlling a plurality of lighting circuits on a motor vehicle, comprising a housing; a first operating lever and a second operating lever supported in side-by-side relationship by said housing for pivotal movement about a common transverse axis; said first operating and said second operating lever each having an arm projecting into said housing; a first cam formed on said arm of said first operating lever; a first pair of contacts carried by said housing for controlling a first lighting circuit; a second cam formed on said arm of said second operating lever; a second pair of contacts carried by said housing for controlling a second lighting circuit, said first operating lever having a first position wherein said first cam closes said first pair of contacts to complete said first lighting circuit and a second position wherein said first pair of contacts remain open, said second operating lever having a first position wherein said second cam closes said second pair of contacts to complete said second lighting circuit and a second position wherein said second pair of contacts remain open; and cooperating means formed on said arm of said first operating lever and on said arm of said second operating lever for causing said first operating lever to independently close said first pair of contacts when moved from said second position to said first position and for causing said second operating lever to close said second pair of contacts and simultaneously shift said first operating lever to said first position to close said first pair of contacts when said first operating lever and said second operating lever are in said second position and said second operating lever is moved from said second position to said first position.

3. A switch for controlling a plurality of lighting circuits on a motor vehicle, comprising a housing having a pair of laterally spaced side walls; a first operating lever and a second operating lever supported in side-by-side relationship by said housing for pivotal movement about a common transverse axis defined by a shaft extending between said side walls, said first operating lever and said second operating lever each having at least one button section located exteriorly of said housing and an arm projecting into said housing; a first cam formed on said arm of said first operating lever; a first pair of contacts carried by said housing for controlling a first lighting circuit; a second cam formed on said arm of said second operating lever and located in the plane of said first cam; a second pair of contacts carried by said housing for controlling a second lighting circuit, said first operating lever having a first position wherein said first cam closes said first pair of contacts to complete said first lighting circuit and a second position wherein said first pair of contacts remain open, said second operating lever having a first position wherein said second cam closes said second pair of contacts to complete said second lighting circuit and a second position wherein said second pair of contacts remain open, said first pair of contacts and said second pair of contacts each having one contact thereof formed with a V-shaped section that serves as a detent for maintaining the associated operating lever in said first position and in said second position; and cooperating surfaces formed on said arm of said first operating lever and on said arm of said second operating lever for causing said first operating lever to independently close said first pair of contacts when moved from said second position to said first position and for causing said second operating lever to close said second pair of contacts and simultaneously shift said first operating lever to said first position to close said first pair of contacts when said first operating lever and said second operating lever are in said second position and said second operating lever is moved from said second position to said first position.

* * * * *